(12) United States Patent
Brune et al.

(10) Patent No.: US 7,622,825 B2
(45) Date of Patent: Nov. 24, 2009

(54) WIDE-VOLTAGE-RANGE CONVERTER

(75) Inventors: Richard Brune, Fürth (DE); Kurt Göpfrich, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 326 days.

(21) Appl. No.: 11/470,409

(22) Filed: Sep. 6, 2006

(65) Prior Publication Data
US 2008/0179951 A1 Jul. 31, 2008

(30) Foreign Application Priority Data
Sep. 6, 2005 (DE) .................. 10 2005 042 319

(51) Int. Cl.
*H02J 1/00* (2006.01)
(52) U.S. Cl. ....................................... 307/82
(58) Field of Classification Search .............. 307/82
See application file for complete search history.

(56) References Cited

U.S. PATENT DOCUMENTS 5,982,645 A * 11/1999 Levran et al. ............. 363/37
6,515,878 B1 2/2003 Meins et al.
7,139,180 B1 * 11/2006 Herbert ..................... 363/124
2003/0161168 A1 * 8/2003 Kawashima et al. ....... 363/125

FOREIGN PATENT DOCUMENTS

| DE | 40 26 955 C2 | 8/1994 |
| DE | 43 05 243 C2 | 8/1995 |
| DE | 197 02 042 A1 | 7/1997 |
| DE | 197 11 017 A1 | 10/1998 |
| DE | 195 24 005 C2 | 8/1999 |
| DE | 199 13 634 A1 | 9/2000 |
| DE | 101 10 375 A1 | 9/2002 |
| EP | 0 244 180 A2 | 11/1987 |
| WO | WO 00/48299 | 8/2000 |

* cited by examiner

*Primary Examiner*—Robert L. Deberadinis
(74) *Attorney, Agent, or Firm*—Henry M. Feiereisen; Ursula B. Day

(57) ABSTRACT

A wide voltage converter includes a power-supply-side converter unit, n load-side converter units, and a step-up/step-down converter device having n transformers. The step-up/step-down converter device electrically connects the power-supply-side converter unit to the n load-side converter units. The wide-voltage-range converter is capable of operating without derating with n specified output voltages, which can be predetermined independent from one another, and reliably inhibits restart.

20 Claims, 3 Drawing Sheets

WIDE-VOLTAGE-RANGE CONVERTER

CROSS-REFERENCES TO RELATED APPLICATIONS

This application claims the priority of German Patent Application, Serial No. 10 2005 042 319.1, filed Sep. 6, 2005, pursuant to 35 U.S.C. 119(a)-(d), the content(s) of which is/are incorporated herein by reference.

BACKGROUND OF THE INVENTION

The present invention relates to a wide-voltage-range converter.

Nothing in the following discussion of the state of the art is to be construed as an admission of prior art.

An electric motor having a predetermined motor voltage can be connected to different power supplies. The power supplies differ from one another in terms of their power supply voltages. The essential power supply voltages of a three-phase power supply are 200 V to 240 V, 380 V to 480 V, 500 V to 600 V and 660 V to 690 V. A converter is required for operation of the motor, with the converter being connected between a feed power supply and the motor.

A converter of this type has a converter unit on the power supply side and on the load side, these converter units being linked to one another on the DC voltage side. A self-commutated pulse-controlled converter unit is predominantly used as the load-side converter unit. Various converter units can be used on the power supply side. A commercially available simple converter, also referred to as a frequency converter, has a diode bridge as the power-supply-side converter unit. This uncontrolled power-supply-side converter unit is connected to the DC-voltage-side connections of the self-commutated pulse-controlled converter unit on the DC voltage side by means of a voltage intermediate circuit having at least one capacitor.

If energy is to be fed back into the feeding network, then a diode rectifier is used, a respective turn-off semiconductor switch being electrically connected antiparallel with respect to the diodes of the rectifier. The turn-off semiconductor switches are in each case turned on during the current conduction times of the associated diodes, which are determined by the natural commutation instants. On the power supply side, this converter unit controlled at the power supply frequency has a filter having three star- or delta-connected capacitors. The voltage intermediate circuit, which connects the power-supply-side converter unit to the load-side converter unit on the DC voltage side has no capacitors in the case of this converter topology. As a result of the configuration of the power-supply-side converter unit, which is also referred to as the fundamental frequency front end ($F^3E$), this converter is regenerative.

In the case of a further converter topology, instead of a diode rectifier, a self-commutated pulse-controlled converter unit having an inductor in each of the supply lines on the AC voltage side is used as the power-supply-side converter unit. On the DC voltage side, the power-supply-side converter unit, which is also referred to as the active front end (AFE), is electrically conductively connected to the DC-voltage-side connections of the load-side converter unit, in particular of a self-commutated pulse-controlled converter unit, by means of a voltage intermediate circuit having at least one capacitor, preferably an electrolytic capacitor. The use of an AFE as the power-supply-side converter unit means that this converter is congenial to the power supply and regenerative. Moreover, an intermediate circuit voltage is regulated to a predetermined value in a constant fashion.

In the case of a conventional wide-voltage-range converter whose power-supply-side converter unit is embodied in one of the aforementioned topologies (diode rectifier, $F^3E$, AFE), it is necessary to accept a pronounced power derating or else a relatively high power loss. For these reasons, a converter is chosen which, on the power supply voltage side, is adapted to the power supply voltage of a feed power supply and, on the load side, is adapted to a power requirement of a motor to be driven having a predetermined motor voltage.

It would therefore be desirable to provide a wide-voltage-range converter which does not exhibit power derating during operation and which can contactless transmit power between a power-supply-side converter unit and a plurality of load-side converter units.

SUMMARY OF THE INVENTION

According to one aspect of the present invention, a wide-voltage-range converter includes a power-supply-side converter unit having an AC input side and a DC output side, n load-side converter units each having a DC input side, and an n-channel step-up/step-down converter device having n transformers, wherein the n-channel step-up/step-down converter device electrically connects the DC output side of the power-supply-side converter unit to the respective DC input sides of the n load-side converter units The present invention resolves prior art shortcomings by coupling several load-side converter units potential-free to a power-supply-side converter unit and providing an n-channel step-up/step-down converter device with n transformers. The output voltages of each of the n load-side converter units can be configured separately and independent from each by using an n-channel step-up/step-down converter device.

According to another feature of the present invention, the n-channel step-up/step-down converter device may have, on the power supply side, a half-bridge circuit having two turn-off semiconductor switches, wherein the half-bridge circuit is electrically connected in parallel with a series circuit formed by two capacitors, and, on the load side, n half-bridge circuits, each having two turn-off semiconductor switches, wherein each of the half-bridge circuits can be electrically connected in parallel with a series circuit formed by two capacitors. Each primary winding of the n transformers of the n-channel step-up/step-down converter device is connected by a first connection to a terminal of the two turn-off semiconductor switches of the power-supply-side half-bridge circuit and by a second connection to a terminal of the two capacitors electrically connected in series. The n secondary windings are similarly connected to a corresponding half-bridge circuit with an associated series circuit formed by two capacitors.

With this configuration of the n-channel step-up/step-down converter device, a high-frequency rectangular-waveform voltage having a predetermined amplitude is generated independently of a power supply voltage of a feed power supply at the primary windings, from which predetermined DC voltages are determined for each of the n power-supply-side converter units. The predetermined DC voltages can advantageously be limited to an arbitrary value by means of protective circuits. The protective circuits are provided in each case for protecting the loads connected downstream (converter units with motor).

Consequently, a wide-voltage-range converter is obtained which permits operation without derating with specified output voltages. Sated differently, the wide-voltage-range converter has load-side converter units with output voltages adapted to a load, in particular a motor (power-optimized load-side converter unit). Moreover, the n transformers do not have a DC current flowing due to the capacitive coupling and their windings are extremely light-weight due to the high-frequency clocking of the converter unit valves. Moreover, the use of transformers results in a simple base turn-off path for a safety-oriented restart inhibit.

If a power-supply-side converter unit in the $F^3E$ embodiment is used, then this results in a wide-voltage-range converter whose power-supply-side converter unit is regenerative, simple to control and generates low power supply harmonics.

The DC voltages at the output of the n-channel step-up/step-down converter device can be regulated to any desired value depending in each case on a predetermined duty ratio of in each case two load-side converter unit valves of the n-channel step-up/step-down converter device. The values of the voltages are only limited depending on components. By virtue of the fact that the DC voltages are in each case regulated to a predetermined value, a standard converter unit, in particular a self-commutated pulse-controlled converter unit, can be used in each case as the load-side converter unit. Consequently, given a predetermined DC voltage, the choice of such a load-side converter unit is only dependent on a power requirement of a load, in particular a motor.

To reduce the design volume of the n transformers of the step-up/step-down converter device, the turn-off semiconductor switches of the converter unit valves of the power-supply-side and load-side half-bridge circuits of the n-channel step-up/step-down converter device are clocked at high frequency. High frequency denotes a frequency at from at least 20 kHz to hundreds of kHz, in particular 200 kHz. The turn-off semiconductor switches of the converter unit valves of the power-supply-side and load-side half-bridge circuits of the n-channel step-up/step-down converter device advantageously comprise silicon carbide due to the high clock frequency.

According to another feature of the present invention, the n-channel step-up/step-down converter device may be implemented by using a MOS field effect transistor made of silicon carbide as converter unit valves of the power-supply-side and load-side half-bridge circuits of the n-channel step-up/step-down converter device. A junction field effect transistor made of silicon carbide may also in each case be provided as converter unit valves of the power-supply-side and load-side half-bridge circuits of the n-channel step-up/step-down converter device. Likewise, an Insulated Gate Bipolar Transistor (IGBT) made of silicon with an antiparallel-connected diode made of silicon carbide may in each case be provided as turn-off semiconductor switch of the converter unit valves of the power-supply-side and load-side half-bridge circuits of the n-channel step-up/step-down converter devices. This choice of the turn-off semiconductor switches of the converter unit valves of the power-supply-side and load-side half bridge circuits of the n-channel step-up/step-down converter device means that these can be clocked at high frequency, so that the structural size of each of the n transformers is significantly reduced. Moreover, minimal switching losses arise.

According to another feature of the present invention, each primary winding of the n transformers may form a respective connection device. These n connection devices are connected, on the input side, in each case to output-side connections of the half-bridge circuit of the power-supply-side converter unit by means of a two-core cable. A bus having two lines may also be used instead of the n two-core cables. A load-side converter unit is positioned with its input-side secondary winding in direct proximity to a primary winding of each connection device. By using connection devices, the n-channel step-up/step-down converter device is mechanically subdivided into a power-supply-side half-bridge circuit with n connection devices and n load-side half-bridge circuits which are in each case connected up to a load-side converter unit. As a result, without turning off the power-supply-side converter unit, each of the n load-side converter units of this wide-voltage-range converter can be removed or added by a corresponding connection device. By physically moving the input-side secondary winding of a load-side converter unit away, the air gap between the secondary winding and a corresponding primary winding in a connection device becomes so large that energy can no longer be transmitted. Consequently, a simple additional safety-oriented turn-off path is obtained.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
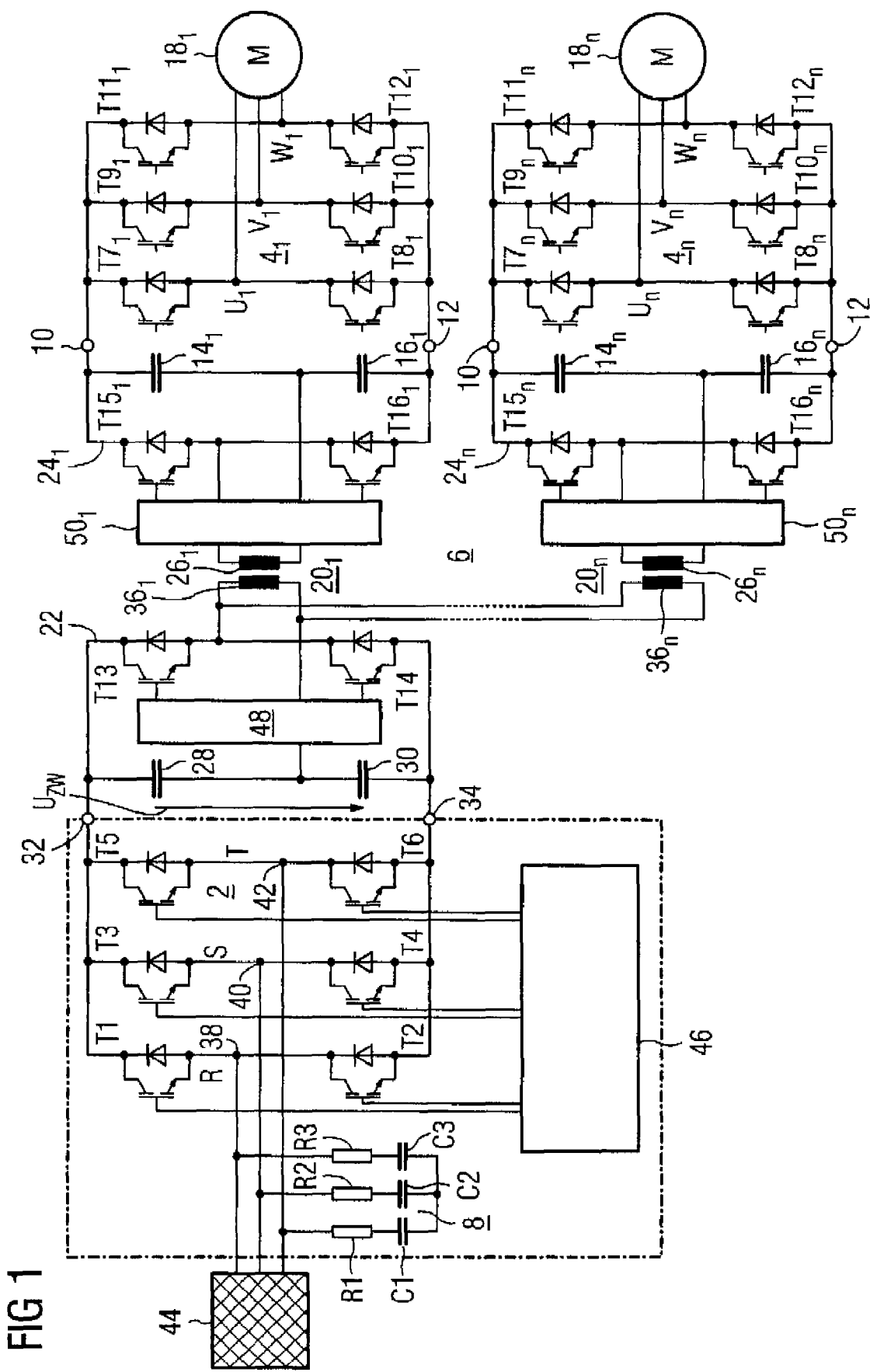
FIG. 1 shows an equivalent circuit diagram of one embodiment of a wide-voltage-range converter according to the present invention.

Throughout all the figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of two applications both filed on the same day. Both applications deal with related inventions. They are commonly owned and have different inventive entity. Both applications are unique, but incorporate the other by reference. Accordingly, the following U.S. patent application is hereby expressly incorporated by reference: "Wide-Voltage-Range Converter" Ser. No. 11/470,418.

Turning now to the drawing, and in particular to FIG. 1, there is shown an equivalent circuit diagram of one embodiment of a wide-voltage-range converter according to the present invention, having a power-supply-side converter unit 2, n load-side converter units $4_1, \ldots, 4_n$, an n-channel step-up/step-down converter device 6 and a power-supply-side filter 8. The power-supply-side converter unit 2 is electrically conductively connected, on the DC voltage side, in each to DC-voltage-side connections 10 and 12 of the load-side converter units $4_1, \ldots, 4_n$ by means of the n-channel step-up/step-down converter device 6. A series circuit formed by two capacitors $14_1, 16_1, \ldots, 14_n, 16_n$, in particular two electrolytic capacitors, is electrically connected in parallel with the DC-voltage-side connections 10 and 12 of each load-side converter unit $4_1, \ldots, 4_n$. A motor $18_1, \ldots, 18_n$, in particular a three-phase motor, is connected to the output terminals $U_1, V_1, W_1 \ldots, U_n, V_n, W_n$ of each load-side converter unit $4_1, \ldots, 4_n$. The load-side converter units $4_1, \ldots, 4_n$ provided are in each case a self-commutated pulse-controlled converter unit having in each case a turn-off semiconductor switch, in particular an insulated gate bipolar transistor (IGBT), as converter unit valves $T7_1$ to $T12_1, \ldots, T7_n$ to $T12_n$. In order to reliably limit the output voltages of the load-side converter units, protective circuitry arrangements may be connected to the motor connections or to the output of the n-channel step-up/step-down converter device.

The n-channel step-up/step-down converter device 6, which, on the DC voltage side, electrically conductively connects the power-supply-side converter unit 2 to the load-side converter units $4_1, \ldots, 4_n$ in a potential-free fashion, has on the power supply side two converter unit valves T13, T14 and on the load side per channel two converter unit valves $T15_1$, $T16_1, \ldots, T15_n, T16_n$ and n transformers $20_1, \ldots, 20_n$. In each case two power-supply-side and load-side converter unit valves T13, T14, and $T15_1, T16_1, \ldots, T15_n, T16_n$ thereby form a respective half-bridge circuit 22 and 24, ..., $24_n$. The half-bridge circuits $24_1, \ldots, 24_n$ of the n-channel step-up/step-down converter device 6 are in each case electrically connected in parallel with a corresponding series circuit formed by two capacitors $14_1, 16_1, \ldots, 14_n, 16_n$, which are electrically connected in parallel with the DC-voltage-side connections 10 and 12 of the load-side converter units $4_1, \ldots, 4_n$. The secondary windings $26_1, \ldots, 26_n$ of the transformers $20_1, \ldots, 20_n$ respectively connect a terminal of the two converter unit valves $T15_1, T16_1, \ldots, T15_n, T16_n$ to a terminal of the two capacitors $14_1, 16_1, \ldots, 14_n, 16_n$ electrically connected in series. A series circuit formed by two capacitors 28 and 30, in particular two film capacitors, is electrically connected in parallel with the bridge path 22 having the converter unit valves T13 and T14 of the n-channel step-up/step-down converter device 6. The series circuit is, moreover, electrically connected in parallel with DC-voltage-side connections 32 and 34 of the power-supply-side converter unit 2. The primary windings $36_1, \ldots, 36_n$ of the n transformers $20_1, \ldots, 20_n$ respectively interconnect a terminal of the two converter unit valves T13 and T14 together with a terminal of the two capacitors 28 and 30. A DC voltage $U_{zw}$ is present at the DC-voltage-side connections 32 and 34 of the power-supply-side converter unit 2, from which DC voltage are generated n DC voltages each having a predetermined amplitude by means of the n-channel step-up/step-down converter device 6. In the generation of the DC voltages having a predetermined amplitude from a fluctuating DC voltage $U_{zw}$, the energy is transmitted contactlessly. An amplitude of the DC voltages is respectively established in a manner dependent on the duty ratios of the converter unit valves $T15_1, T16_1, \ldots, T15_n, T16_n$, the duty radio of the two converter unit valves T13 and T14 of the power-supply-side half-bridge circuit 22 remaining constant. In this mode of operation, the n-channel step-up/step-down converter device 6 operates as a step-up converter.

The power-supply-side converter unit 2 has, as converter unit valves T1, ..., T6, in each case a turn-off semiconductor switch, in particular an IGBT, with antiparallel-connected diode. Two converter unit valves T1, T2 or T3, T4 or T5, T6 in each case form a bridge path, which is also referred to as a converter unit phase R or S or T, respectively. A respective terminal of two converter unit valves T1, T2 or T3, T4 or T5, T6 electrically connected in series of a converter unit phase R or S or T, respectively, forms a power-supply-side connection 38 or 40 or 42, respectively. On the one hand a filter 8 and on the other hand a feed power supply 44 are connected to the power-supply-side connections 38, 40 and 42. The feed power supply may have a power supply voltage having an amplitude of 200 V to 690 V, for example. The filter 8 has three capacitors C1, C2 and C3, which here are electrically star-connected capacitors. However, the capacitors may also be electrically delta-connected capacitors. The filter 8 has, moreover, three damping resistors R1, R2 and R3 that are in each case electrically connected in series with a capacitor C1 and C2 and C3, respectively.

A control device 46 is provided for driving the converter unit valves T1, ..., T6 of the power-supply-side converter unit 2. The control device 46 generates control signals that drive the turn-off semiconductor switches of the converter unit valves T1, ..., T6 in such a way that these are turned on according to the natural triggering instants (point of intersection of two phase voltages or amplitude of a phase-to-phase power supply voltage is equal to zero) of their corresponding antiparallel diodes. By virtue of this power supply frequency control of the turn-off semiconductor switches of the converter unit valves T1, ..., T6 of the power-supply-side converter unit 2, the latter is regenerative at any time. An embodiment of the control device 46 can be found in DE 199 13 634 A1.

A control device 48 is provided for controlling the converter unit valves T13, T14 of the power-supply-side half-bridge circuit 22 of the n-channel step-up/step-down converter device 6. The converter unit valves are driven alternately by means of the control device 48, so that a high-frequency rectangular voltage, for example having an amplitude of 400 V and a frequency of 200 kHz, is present in each case at the primary windings $36_1, \ldots, 36_n$. On the control side, the converter unit valves $T15_1, T16_1, \ldots, T15_n, T16_n$ of the load-side-half-bridge circuits $24_1, \ldots, 24_n$ are in each case linked to a control device $50_1, \ldots, 50_n$. By means of the control devices $50_1, \ldots, 50_n$, DC voltages are generated from the AC voltage present at the secondary windings $26_1, \ldots, 26_n$ in a manner dependent on predetermined duty ratios, the DC voltages being present at the DC-voltage-side connections 10 and 12 of each load-side converter unit $4_1, \ldots, 4_n$. Since the converter unit valves T13, T14, $T15_1, T16_1, \ldots, T15_n, T16_n$ of each half-bridge circuit 22, $24_1, \ldots, 24_n$ of the n-channel step-up/step-down converter device 6 have a dedicated control device 48, $50_1, \ldots, 50_n$, the output voltages of each load-side converter unit $4_1, \ldots, 4_n$ can be set separately and independently of one another.

The power-supply-side converter unit 2 and the power-supply-side filter 8 together form a so-called fundamental frequency front end (F³E). On the DC voltage the, F³E is linked to a series circuit formed by two capacitors 28 and 30, in particular two film capacitors. The capacitors 28 and 30 are required only for supporting the commutation of the turn-off semiconductor switches of the converter unit valves T1, ..., T6. The DC voltage $U_{zw}$ is dropped across the series circuit formed by the capacitors 28 and 30, which DC voltage fluctuates in terms of amplitude at 6 times the power supply frequency and the amplitude of which DC voltage is dependent on the power supply voltage of the feed power supply 38.

Independently of this fluctuating DC voltage $U_{zw}$ at the two capacitors 28 and 30 electrically connected in series, a constant DC voltage having a predetermined amplitude is present in each case at the series circuit formed by the two capacitors $14_1, 16_1, \ldots, 14_n, 16_n$. These constant DC voltages may dependent in each case on a load to be driven and accordingly be safeguarded by a protective circuitry arrangement. By way of example, three-phase motors $18_1, \ldots, 18_n$ are intended to be operated in each case with a stator voltage at a level of 400 V and a predetermined power with the wide-voltage-range converter according to the invention at an arbitrary power supply 44. A self-commutated pulse-controlled converter unit having an input DC voltage at a level of 600 V is in each case required due to the three-phase motors $18_1, \ldots, 18_n$. Independently of the power supply voltage of the feed power supply 44, the n-channel step-up/step-down converter device 6 generates the constant DC voltages in each case with a required constant amplitude of 600 V in a potential-free fashion from a DC voltage $U_{zw}$ present at the input.

In order that each of the n transformers $20_1, \ldots, 20_n$ of the n-channel step-up/step-down converter device 6 occupies as far as possible a small structural volume in order that these can be integrated in the wide-voltage-range converter, the converter unit valves T13, T14, T15$_1$, T16$_1$, ..., T15$_n$, T16$_n$ of the step-up/step-down converter device 6 are clocked at high frequency, for example with a clock frequency of 20 to 200 kHz. In order to be able to implement this high clock frequency, a MOS field effect transistor (MOSFET) or a junction field effect transistor (JFET) is in each case provided as converter unit valves T13, T14, T15$_1$, T16$_1$, ..., T15$_n$, T16$_n$. In the illustrated equivalent circuit diagram of the wide-voltage-range converter, an n-channel enhancement-mode MOSFET is in each case provided as converter unit valves T13, T14, T15$_1$, T16$_1$, ..., T15$_n$, T16$_n$ of the n-channel step-up/step-down converter device 6. In order that the switching losses remain low at a high clock frequency, MOSFETs and JFETs made of silicon carbide are used as converter unit valves T13, T14, T15$_1$, T16$_1$, ..., T15$_n$, T16$_n$ of the n-channel step-up/step-down converter device 6. By means of the n-channel step-up/step-down converter device 6, n constant DC voltages can be regulated to any desired value. These desired constant DC voltages are limited in a manner dependent on components.

The power-supply-side converter unit 2 is dimensioned in such a way that the converter unit valves T1, ..., T6 are designed for a current resulting from a lowest power supply voltage at a desired power of motors $18_1, \ldots, 18_n$ to be driven. A design of this type is handled by the turn-off semiconductor switches of the converter unit valves T1, ..., T6 since these are only clocked at the power supply frequency.

Figure 2:
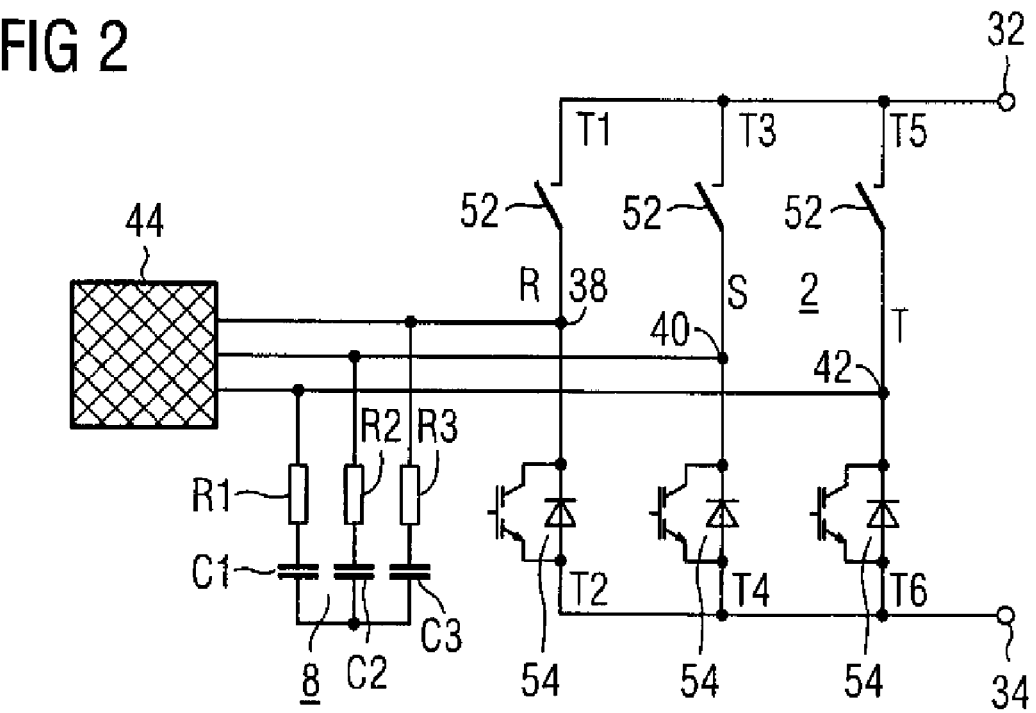
FIGS. 2 and 3 show each an equivalent circuit diagram of a further regenerative power-supply-side converter unit of the wide-voltage-range converter according to FIG. 1.

In accordance with the equivalent circuit diagram according to FIG. 2, the power-supply-side converter unit 2 has a bidirectional switch 52 and a turn-off semiconductor switch 54 as converter unit valves T1, T2 and T3, T4 and T5, T6 of each phase R, S and T, respectively. In this illustrated embodiment of the power-supply-side converter unit 2, a respective bidirectional switch 52 is provided for the upper converter unit valves T1, T3 and T5. Embodiments for a bidirectional switch 52 are illustrated in greater detail in FIGS. 2 to 4 of the aforementioned concurrently filed U.S. patent application titled "Wide-voltage-range converte". The turn-off semiconductor switch 54 provided in this embodiment in each case for the lower converter unit valves T2, T4 and T6 of the power-supply-side converter unit 2 has an IGBT with antiparallel-connected diode. The IGBTs of the turn-off semiconductor switches 54 are controlled in such a way that these are in the on state at the current conduction times of the corresponding diodes. Consequently, the IGBTs of the turn-off semiconductor switches 54 are driven at the natural commutation instants. A filter 8 is electrically connected in parallel with the power-supply-side input connections 38, 40 and 42 of the power-supply-side converter unit 2. Moreover, the power-supply-side converter unit 2 is connected to the feed power supply 44 by means of the input connections 38, 40 and 42. The feed power supply 44 may have a power supply voltage having an amplitude of 200 V to 690 V, by way of example. The filter 8 has three capacitors C1, C2 and C3, which here are star-connected capacitors. However, the capacitors may also be delta-connected capacitors. Moreover, the filter 8 has three damping resistors R1, R2 and R3 that are in each case electrically connected in series with a capacitor C1 and C2 and C3, respectively.

Figure 3:
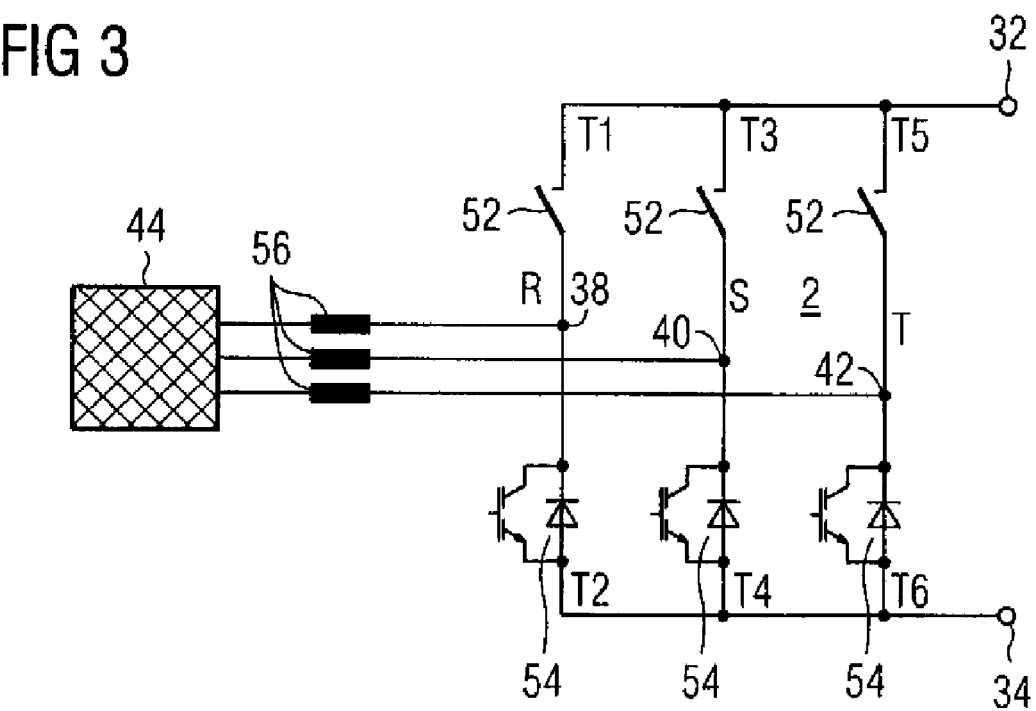

In the embodiment in accordance with FIG. 3, the power-supply-side converter unit 2 has a bidirectional switch 52 and a turn-off semiconductor switch 54 as converter unit valves T1, T2 and T3, T4 and T5, T6 of each phase R, S and T, respectively. In the illustrated embodiment of the power-supply-side converter unit 2, a respective bidirectional switch 52 is provided for the upper converter unit valves T1, T3 and T5. Embodiments for a bidirectional switch 52 are illustrated in greater detail in FIGS. 2 to 4 of the concurrently filed U.S. patent application titled "Wide-voltage-range converter", naming xyz as inventors (Atty. Docket No. Brune-2). The turn-off semiconductor switch 54 provided in this embodiment in each case for the lower converter unit valves T2, T4 and T6 of the power-supply-side converter unit 2 has an IGBT with an antiparallel-connected diode. The DC-voltage-side connections of each phase R, S and T of the power-supply-side converter unit 2 are linked to one another in such a way that the phases R, S and T are electrically connected in parallel. The connections form the DC-voltage-side output connections 32 and 34 of the power-supply-side converter unit 2. The output connections 32 and 34 are linked to the DC-voltage-side connections 10 and 12 of the n load-side converter units $4_1, \ldots, 4_n$ by means of the n-channel step-up/step-down converter device 6. Power-supply-side input connections 38, 40 and 42 of the power-supply-side converter unit 2 are electrically conductively linked to a feed power supply 44 by means of inductors 56, where the feed power supply 44 may have a power supply voltage having an amplitude of 200 V to 690 V, by way of example.

Figure 4:
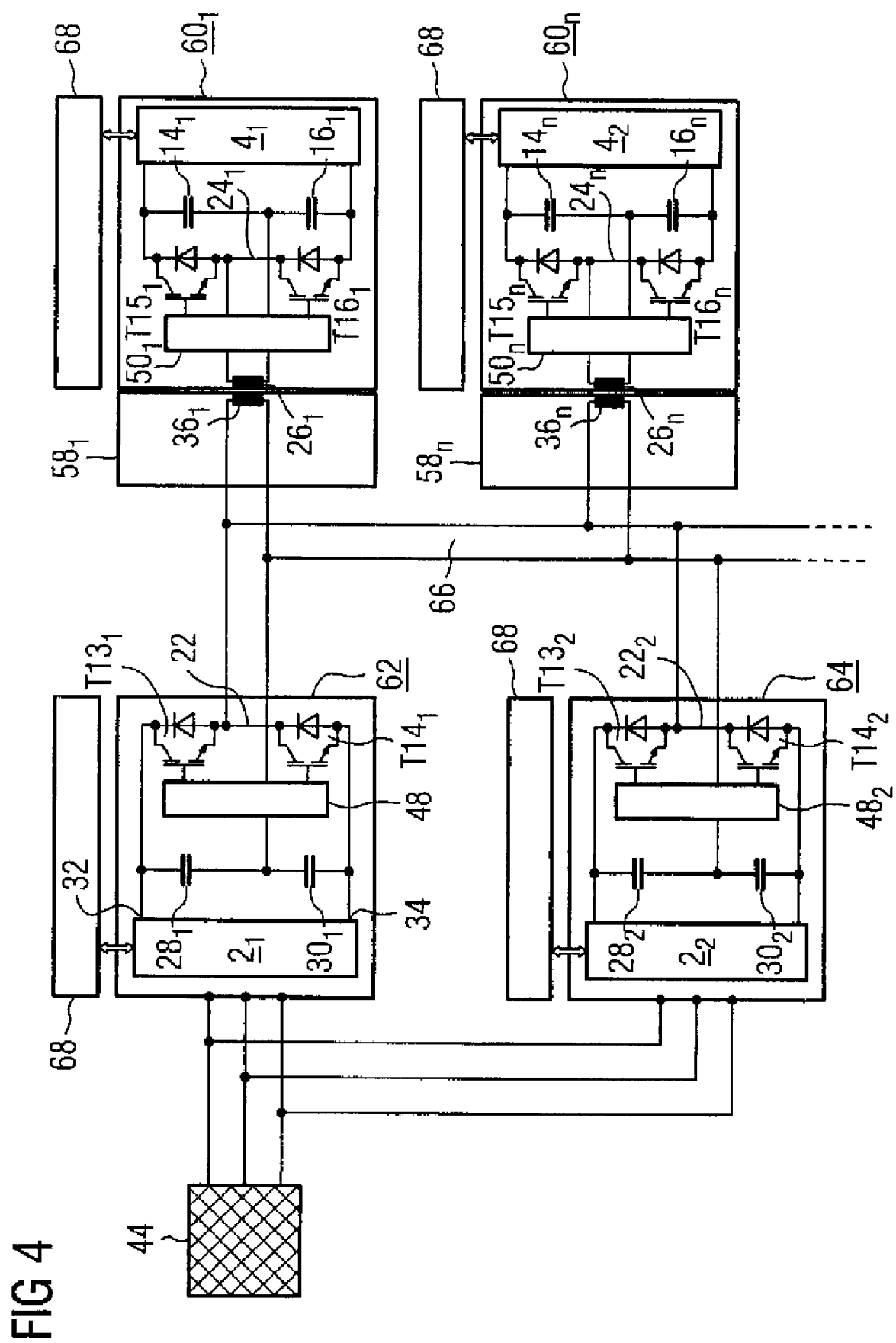
FIG. 4 shows an equivalent circuit diagram of a another embodiment of a wide-voltage-range converter according to the present invention.

In accordance with the equivalent circuit diagram of FIG. 4, this second embodiment of the wide-voltage-range converter according to the invention has a second power-supply-side converter unit $2_2$ in addition to the components of the wide-voltage-range converter in accordance with FIG. 1. A second power-supply-side converter unit $2_2$ is required precisely when the wide-voltage-range converter is intended to be regenerative, although the power-supply-side converter $2_1$ is not regenerative. Moreover, this second embodiment of the wide-voltage-range converter differs from the embodiment in accordance with FIG. 1 by virtue of the fact that in the case of the n-channel step-up/step-down converter device 6, the primary winding $36_1, \ldots, 36_n$ of the n transformers $20_1, \ldots, 20_n$ are in each case accommodated in a connection device $58_1, \ldots, 58_n$. The secondary windings $26_1, \ldots, 26_n$ of the n transformers $20_1, \ldots, 20_n$ with the half-bridge circuits $24_1, \ldots, 24_n$ in each case with the parallel-connected series circuit formed by two capacitors $14_1, \ldots, 14_n$ and $16_1, \ldots, 16_n$ form, together with corresponding load-side converter units $4_1, \ldots, 4_n$, in each case a converter unit apparatus $60_1, \ldots, 60_n$. In this case, the primary windings $36_1, \ldots, 36_n$ of each connection device $58_1, \ldots, 58_n$, and the secondary windings $26_1, \ldots, 26_n$ are arranged in a connection device $58_1, \ldots, 58_n$ and a converter unit apparatus $60_1, \ldots, 60_n$ in such a way that the windings $36_1, \ldots, 36_n$ and $26_1, \ldots, 26_n$ are arranged opposite one another as soon as a converter unit apparatus $60_1, \ldots, 60_n$ is arranged in spatial proximity to the corresponding connection device $58_1, \ldots, 58_n$. The coupling of each converter unit apparatus $60_1, \ldots, 60_n$ is effected via the air gap between the primary and secondary windings $36_1, \ldots, 36_n$ and $26_1, \ldots, 26_n$. The n connection devices $58_1, \ldots, 58_n$ are in each case electrically conductively connected to the power-supply-side converter unit apparatus 62 by means of a two-core cable. The power-supply-side converter unit apparatus 62 has the power-supply-side converter unit $2_1$ and the half-bridge circuit 22 with the electrically parallel-connected series circuit formed by the two capacitors $28_1$ and $30_1$. This parallel circuit comprising half-bridge circuit 22 and series circuit formed by two capacitors $28_1$ and $30_1$ is connected in parallel with the DC-voltage-side connections 32 and 34 of the power-supply-side converter unit $2_1$. The converter unit apparatus 62 forms the incoming feeder module in the case of this wide-voltage-range converter, the components of which may be arranged spatially separately. Since this module is not formed in regenerative fashion, a correspondingly constructed converter unit apparatus 64 is provided as a regenerative module. In a preferred embodiment of this second embodiment of the wide-voltage-range converter according to the invention, the converter unit apparatuses 62 and 64 and the n connection devices $58_1, \ldots, 58_n$ are electrically conductively linked to one another by means of a bus 66. Moreover, each converter unit apparatus $60_1, \ldots, 60_n$, 62 and 64 is assigned a device 68 for buffering energy, thereby enabling momentary emergency operation in the event of power supply failure for coordinated shutdown of the converter unit apparatuses $60_1, \ldots, 60_n$, 62 and 64. This embodiment of the wide-voltage-range converter according to the invention with hot-pluggable converter unit apparatuses $60_1, \ldots, 68_n$ has a turn-off path for a safety-oriented restart inhibit.

This converter topology according to the invention results in a wide-voltage-range converter without derating with specified output voltages. The n load-side converter units $4_1, \ldots, 4_n$, in particular the self-commutated pulse-controlled converter units, can now in each case be optimized in terms of power since a predetermined DC voltage having a regulated amplitude is always present on the DC voltage side independently of the feed power supply 44. With this wide-voltage-range converter according to the invention, it is possible to operate motors $18_1, \ldots, 18_n$, in particular three-phase motors, in each case having a predetermined power with a defined motor voltage at the important power supplies (3AC200V-240V, 3AC380V-480V, 3AC500V-600V, 3AC660V-690V) in conjunction with a minimized power loss and full power provision in the entire wide voltage range.

A mechanical engineer who would like to use only one type of motor having a predetermined power and a predetermined motor voltage in his machines for driving individual components of the machines can now produce his machine for the wide-voltage-range with this wide-voltage-range converter according to the invention. This eliminates the need to keep a plurality of different converters in stock.

Consequently, this wide-voltage-range converter according to the invention in the embodiment in accordance with FIG. 1 has the advantages of a fundamental frequency front end ($F^3E$), namely low power supply harmonics, regenerative capability, simple drivability and a wide-voltage-range without derating with specified converter output voltages, the converter output voltages no longer being mismatched with respect to customary motor voltages and the load-side converter units $4_1, \ldots, 4_n$ being power-optimized. In addition to these advantages, there are also further advantages resulting from the configuration of the n-channel step-up/step-down converter device 6.

The use of n transformers $20_1, \ldots, 20_n$ as inductive couplings of the n-channel step-up/step-down converter device 6 means that required energies of each load are transmitted contactlessly from the power-supply-side converter unit 2 to the load-side converter unit $4_1, \ldots, 4_n$. Moreover, the load-side converter units $4_1, \ldots, 4_n$, are potential-isolated from the power-supply-side converter unit 2. As a result, high currents to ground can no longer arise, whereby the EMC measures are simplified. Besides these advantages, the use of n transformers $20_1, \ldots, 20_n$ as inductive coupling of the n-channel step-up/step-down converter device 6 means that the wide-voltage-range converter acquires additional safety-oriented turn-off paths if the n transformers $20_1, \ldots, 20_n$ are embodied such that they can be mechanically isolated between primary side and secondary side.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A wide-voltage-range converter, comprising
    a power-supply-side converter unit having a DC output side,
    n load-side converter units each having a DC input side, and
    an n-channel step-up/step-down converter device having n transformers,
    wherein the n-channel step-up/step-down converter device electrically connects the DC output side of the power-supply-side converter unit to respective DC input sides of the n load-side converter units,
    wherein a power supply side of the n-channel step-up/step-down converter device comprises a half-bridge circuit having two turn-off semiconductor switches, two capacitors electrically connected in series, with the series connection electrically connected in parallel with the half-bridge circuit,
    wherein a load side of the n-channel step-up/step-down converter device comprises n half-bridge circuits each having two turn-off semiconductor switches and two capacitors electrically connected in series, with the series-connection connected in parallel with a corresponding one of the half-bridge circuits,
    wherein a first terminal of a primary winding of each of the n transformers is connected to a corresponding terminal of the two turn-off semiconductor switches of the half-bridge circuit on the power supply side and a second terminal of the primary winding of each of the n transformers is connected to a terminal connecting the two capacitors on the power supply side, and
    wherein a first terminal of a secondary winding of each of the n transformers is connected to a corresponding terminal of the two turn-off semiconductor switches of the half-bridge on the load side and a second terminal of the secondary winding of each of the n transformers is connected to a corresponding terminal connecting the two capacitors on the load side.

2. The wide-voltage-range converter of claim 1, wherein each of the half-bridge circuits comprises a corresponding drive device with an output side having control outputs, with each control output connected to a corresponding control input of the two turn-off semiconductor switches of the half-bridge circuits on the power supply side and load side, respectively.

3. The wide-voltage-range converter of claim 1 wherein the power-supply-side converter unit comprises a regenerative converter unit.

4. The wide-voltage-range converter of claim 3, wherein the power-supply-side converter unit has an AC voltage side receiving a plurality of phases and a filter on the AC voltage side, and wherein each phase of the power-supply-side converter unit comprises as a converter unit valve a turn-off semiconductor switch with an antiparallel-connected diode.

5. The wide-voltage-range converter of claim 4, wherein the power-supply-side filter comprises three capacitors connected in a star configuration.

6. The wide-voltage-range converter of claim 5, wherein a damping resistor is electrically connected in series with each capacitor of the power-supply-side filter.

7. The wide-voltage-range converter of claim 4, wherein the power-supply-side filter comprises three capacitors connected in a delta configuration.

8. The wide-voltage-range converter of claim 3, wherein the power-supply-side converter unit has an AC voltage side receiving a plurality of phases and a filter on the AC voltage side, and wherein each phase of the power-supply-side converter unit comprises as a converter unit valve a bidirectional switch and a turn-off semiconductor switch.

9. The wide-voltage-range converter of claim 8, wherein the power-supply-side filter comprises three capacitors connected in a star configuration.

10. The wide-voltage-range converter of claim 9, wherein a damping resistor is electrically connected in series with each capacitor of the power-supply-side filter.

11. The wide-voltage-range converter of claim 8, wherein the power-supply-side filter comprises three capacitors connected in a delta configuration.

12. The wide-voltage-range converter of claim 3, wherein the power-supply-side converter unit has an AC voltage side with input terminals for different phases, with each input terminal connected to an inductor, and wherein each phase of the power-supply-side converter unit comprises a bidirectional switch and a turn-off semiconductor switch.

13. The wide-voltage-range converter of claim 1, wherein each primary winding of the n transformers forms a corresponding connection device.

14. The wide-voltage-range converter of claim 1, wherein the converter unit valves of the step-up/step-down converter device comprise MOS field effect transistor.

15. The wide-voltage-range converter claim 14, wherein the field effect transistor is made of silicon carbide.

16. The wide-voltage-range converter of claim 1, wherein the converter unit valves of the step-up/step-down converter device comprise a junction field effect transistor.

17. The wide-voltage-range converter claim 16, wherein the field effect transistor is made of silicon carbide.

18. The wide-voltage-range converter of claim 1, wherein the converter unit valves of the step-up/step-down converter device comprise an insulated gate bipolar transistor with antiparallel diode made of silicon carbide.

19. The wide-voltage-range converter of claim 1, wherein the capacitors on the power supply side of the n-channel step-up/step-down converter device each comprise a film capacitor.

20. The wide-voltage-range converter of claim 1 wherein the n transformers comprise corresponding magnetic cores configured for mechanical separation.

* * * * *